(12) United States Patent
Cochran et al.

(10) Patent No.: US 11,505,322 B2
(45) Date of Patent: Nov. 22, 2022

(54) ARM CAP FRICTION HINGE MECHANISM

(71) Applicant: B/E Aerospace, Inc., Winston-Salem, NC (US)

(72) Inventors: Robert L. Cochran, Kernersville, NC (US); Mark E. Cefaretti, Winston Salem, NC (US)

(73) Assignee: B/E Aerospace, Inc., Winston-Salem, NC (US)

(*) Notice: Subject to any disclaimer, the term of this patent is extended or adjusted under 35 U.S.C. 154(b) by 228 days.

(21) Appl. No.: 17/063,462

(22) Filed: Oct. 5, 2020

(65) Prior Publication Data
US 2022/0106045 A1  Apr. 7, 2022

(51) Int. Cl.
*E05D 3/06* (2006.01)
*B64D 11/06* (2006.01)
*E05D 11/08* (2006.01)

(52) U.S. Cl.
CPC ............ *B64D 11/0636* (2014.12); *E05D 3/06* (2013.01); *E05D 11/084* (2013.01)

(58) Field of Classification Search
CPC ........... Y10T 16/5403; Y10T 16/54038; Y10T 16/547; Y10T 16/5474; Y10T 16/5475; Y10T 16/5476; B64D 11/06; B64D 11/0627; B64D 11/0636; B64D 11/0638; B64D 11/0644; E05D 3/06; E05D 3/08; E05D 3/14; E05D 3/145; E05D 3/16; E05D 11/08; E05D 11/082; E05D 11/084; E05D 11/085; E05D 2003/163
See application file for complete search history.

(56) References Cited

U.S. PATENT DOCUMENTS

| 3,701,834 A | 10/1972 | Rubio |
| 4,930,185 A | 6/1990 | Hutton |
| (Continued) | | |

FOREIGN PATENT DOCUMENTS

| CN | 2612866 | 4/2004 |
| CN | 202970212 U | 6/2013 |
| (Continued) | | |

OTHER PUBLICATIONS

Hangzhou PUWEI Technology Co., Ltd., Four-Bar Friction Hinge, https://windowdoor.en.ec21.com/Four_bar_Friction_Hinge_Hinge-1049381_938160.html, 3 pages, Printed on Oct. 5, 2020.

(Continued)

*Primary Examiner* — Chuck Y Mah
(74) *Attorney, Agent, or Firm* — Suiter Swantz pc llo (57) ABSTRACT

An arm cap friction hinge mechanism may include a center link; a first top link, a top friction hinge link, a second top link, and a top pin link coupled to the center link; an upper hinge mount coupled to an arm cap, to the first top link, and to the top friction hinge link via a first friction hinge; an upper pin mount coupled to the arm cap of the aircraft seat, to the second top link, and to the top pin link. The center link may be coupled to at least one hinge mount via at least a second friction hinge. The arm cap may be configured to actuate between a closed position and a first open position around the first friction hinge, and between the first open position and a second open position about an axis through the at least a second friction hinge.

15 Claims, 11 Drawing Sheets

(56) References Cited

U.S. PATENT DOCUMENTS

| | | | |
|---|---|---|---|
| 4,960,256 A * | 10/1990 | Chihara | G06F 1/1616 16/361 |
| 6,584,645 B2 | 7/2003 | Migli | |
| 6,832,412 B2 * | 12/2004 | Kim | E05F 1/1215 16/365 |
| 6,969,792 B2 | 11/2005 | Wang | |
| 7,765,644 B2 * | 8/2010 | Ueyama | G06F 1/1681 16/354 |
| 7,784,154 B2 | 8/2010 | Chen | |
| 8,424,160 B2 | 4/2013 | Chen | |
| 9,055,813 B2 | 6/2015 | Telthörster et al. | |
| 9,366,064 B1 * | 6/2016 | Chen | E05F 1/12 |
| 10,401,917 B1 * | 9/2019 | Dai | G06F 1/1681 |
| 10,486,568 B2 * | 11/2019 | Davis | B60N 2/797 |
| 10,656,685 B2 * | 5/2020 | Cheng | G06F 1/1681 |
| 11,220,197 B2 * | 1/2022 | Hodgson | B60N 2/793 |
| 11,261,636 B2 * | 3/2022 | Homner | E05F 1/1215 |
| 2012/0273449 A1 * | 11/2012 | Hsu | F16M 11/2021 211/195 |
| 2017/0139446 A1 * | 5/2017 | Lan | E05D 3/18 |
| 2018/0100336 A1 * | 4/2018 | Choi | B60N 2/793 |
| 2019/0375335 A1 * | 12/2019 | Suzuki | B60R 7/04 |
| 2021/0207414 A1 * | 7/2021 | Wong | E05D 3/186 |

FOREIGN PATENT DOCUMENTS

| | | | | |
|---|---|---|---|---|
| DE | 2757230 A1 | | 7/1979 | |
| DE | 10014783 A1 * | | 10/2001 | B60R 7/04 |
| DE | 102017130183 A1 * | | 8/2018 | B60N 2/753 |
| EP | 0736659 B1 | | 4/2004 | |
| GB | 2134392 B | | 3/1986 | |
| JP | S59102637 U | | 7/1984 | |
| JP | 2018071076 A * | | 5/2018 | |
| WO | 2017180891 A1 | | 10/2017 | |

OTHER PUBLICATIONS

Mechanical Motion Technologies, LLC, Friction Hinges, Rotary Viscous Dampers & the One-Way Clutch, https://www.mmtech.us/friction-hinges-rotary-viscous-dampers-the-one-way-clutch/, 3 pages, Printed Oct. 5, 2020.

Extended Search Report in European Application No. 21200641.5 dated Mar. 4, 2022, 5 pages.

* cited by examiner

ARM CAP FRICTION HINGE MECHANISM

BACKGROUND

Select aircraft seats may include a center console with an arm cap. The arm cap may provide access to a storage compartment within the center console. In select arrangements, the adjacent aircraft seats may share a center console. In these arrangements, the arm caps of each respective aircraft seat may interfere with one another when either is opened or closed.

SUMMARY

An arm cap friction hinge mechanism is disclosed, in accordance with one or more embodiments of the disclosure. The arm cap friction hinge mechanism may include a center link. The arm cap friction hinge mechanism may include a first top link coupled to the center link. The arm cap friction hinge mechanism may include a top friction hinge link coupled to the center link. The arm cap friction hinge mechanism may include an upper hinge mount coupled to an arm cap of an aircraft seat. The upper hinge mount may be coupled to the first top link. The upper hinge mount may be coupled to the top friction hinge link via a first friction hinge. The arm cap may be configured to actuate between a closed position and a first open position around the first friction hinge. The arm cap friction hinge mechanism may include a second top link coupled to the center link. The arm cap friction hinge mechanism may include a top pin link coupled to the center link. The arm cap friction hinge mechanism may include an upper pin mount coupled to the arm cap of the aircraft seat. The upper pin mount may be coupled to the second top link and the top pin link. The arm cap friction hinge mechanism may include at least one hinge mount coupled to the aircraft seat. The center link may be coupled to the at least one hinge mount via at least a second friction hinge. The arm cap may be configured to actuate between the first open position and a second open position about an axis through the at least a second friction hinge.

In some embodiments, the actuation of the arm cap via the arm cap friction hinge mechanism may be configured to allow a cushion coupled to the arm cap to avoid an adjacent cushion of an adjacent arm cap during actuation.

In some embodiments, the first top link and the top friction hinge link may be coupled to a first side of the center link. The second top link and the top pin link may be coupled to a second side of the center link.

In some embodiments, the upper hinge mount may be coupled to the first top link and the top friction hinge link opposite the center link.

In some embodiments, the upper pin mount may be coupled to the second top link and the top pin link opposite the center link.

In some embodiments, the at least one hinge mount may include a first hinge mount and a second hinge mount.

In some embodiments, the at least a second friction hinge may include a second friction hinge and a third friction hinge. The first hinge mount may be coupled to the center link via the second friction hinge. The second hinge mount may be coupled to the center link via the third friction hinge.

In some embodiments, portions of the center link, the first top link, the top friction hinge link, and the upper hinge mount may form a first linkage assembly.

In some embodiments, portions of the center link, the second top link, the top pin link, and the upper pin mount may form a second linkage assembly.

In some embodiments, the first friction hinge may be configured to act on the first linkage assembly and the second linkage assembly. The arm cap may be configured to actuate between the closed position and the first open position around the first friction hinge, the first linkage assembly, and the second linkage assembly.

In some embodiments, the at least a second friction hinge may provide a greater force on the center link than the force provided by the first friction hinge on the first linkage assembly and the second linkage assembly.

In some embodiments, the first friction hinge may be a one-way friction hinge.

In some embodiments, the at least a second friction hinge may be a two-way friction hinge.

An arm cap friction hinge mechanism is disclosed, in accordance with one or more embodiments of the disclosure. The arm cap friction hinge mechanism may include a first linkage assembly coupled to an arm cap of an aircraft seat. The arm cap friction hinge mechanism may include a second linkage assembly coupled to the arm cap of the aircraft seat. The arm cap friction hinge mechanism may include a center link. The center link may be a linkage of the first linkage assembly and a linkage of the second linkage assembly. The arm cap friction hinge mechanism may include a first friction hinge may be configured to act on the first linkage assembly and the second linkage assembly. The arm cap may be configured to actuate between a closed position and a first open position around the first friction hinge, the first linkage assembly, and the second linkage assembly. The arm cap friction hinge mechanism may include at least one hinge mount coupled to the aircraft seat. The arm cap friction hinge mechanism may include at least a second friction hinge. The center link may be coupled to the at least one hinge mount via the at least a second friction hinge. The arm cap may be configured to actuate between the first open position and a second open position about an axis through the at least a second friction hinge.

In some embodiments, the actuation of the arm cap around the first friction hinge, the first linkage assembly, the second linkage assembly, and the at least a second friction hinge may be configured to allow a cushion coupled to the arm cap to avoid an adjacent cushion of an adjacent arm cap during actuation.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-3F in general illustrate an aircraft seat friction hinge mechanism, in accordance with one or more embodiments of the disclosure.

Figure 1A:
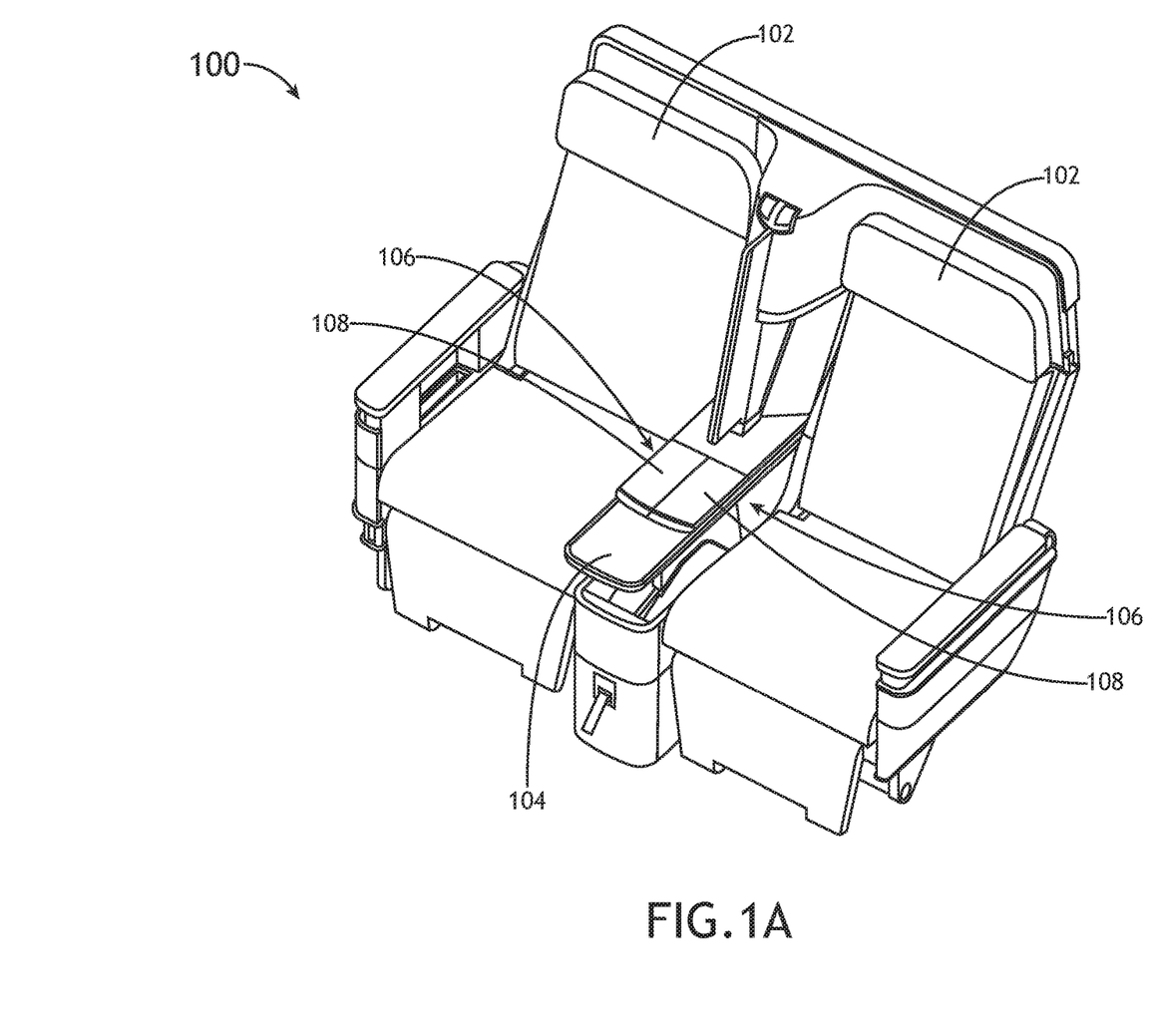
FIG. 1A illustrates a perspective view of a set of aircraft seats, in accordance with one or more embodiments of the disclosure.
Figure 1B:
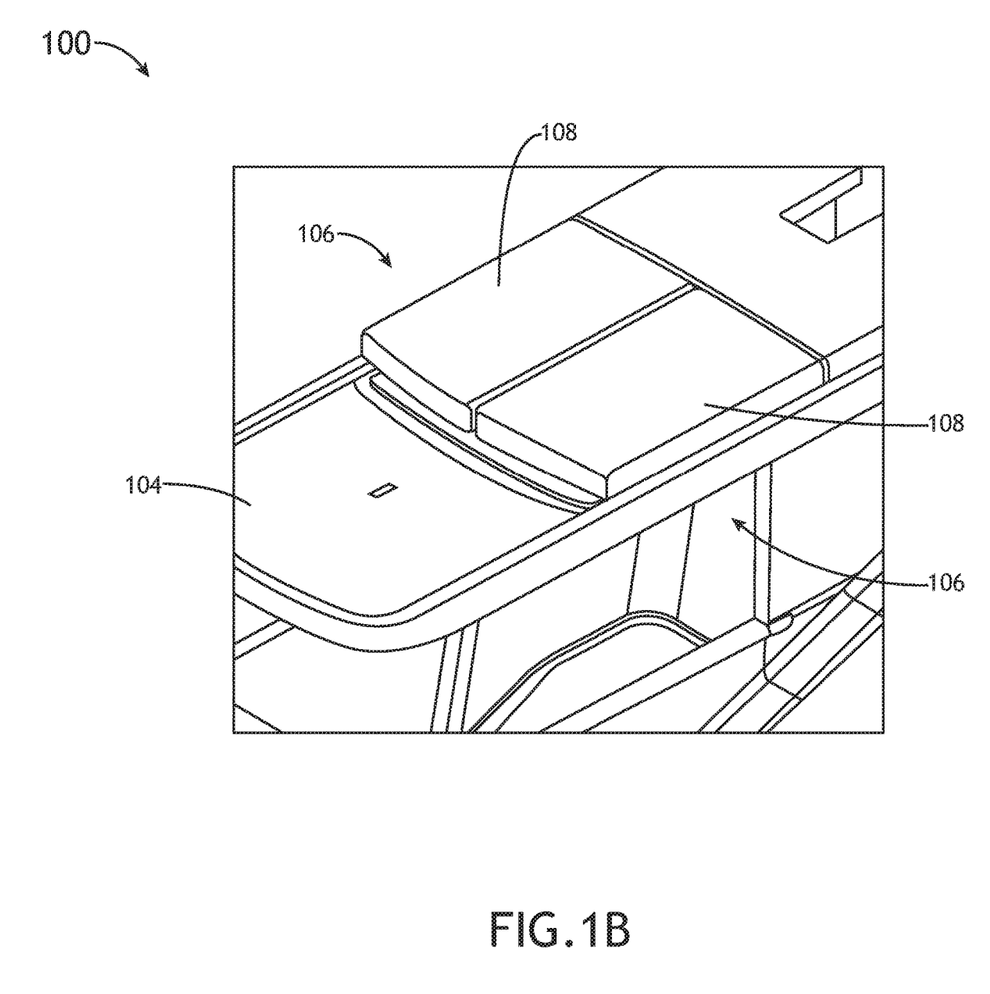
FIG. 1B illustrates a perspective view of a portion of a set of aircraft seats, in accordance with one or more embodiments of the disclosure.
Figure 1C:
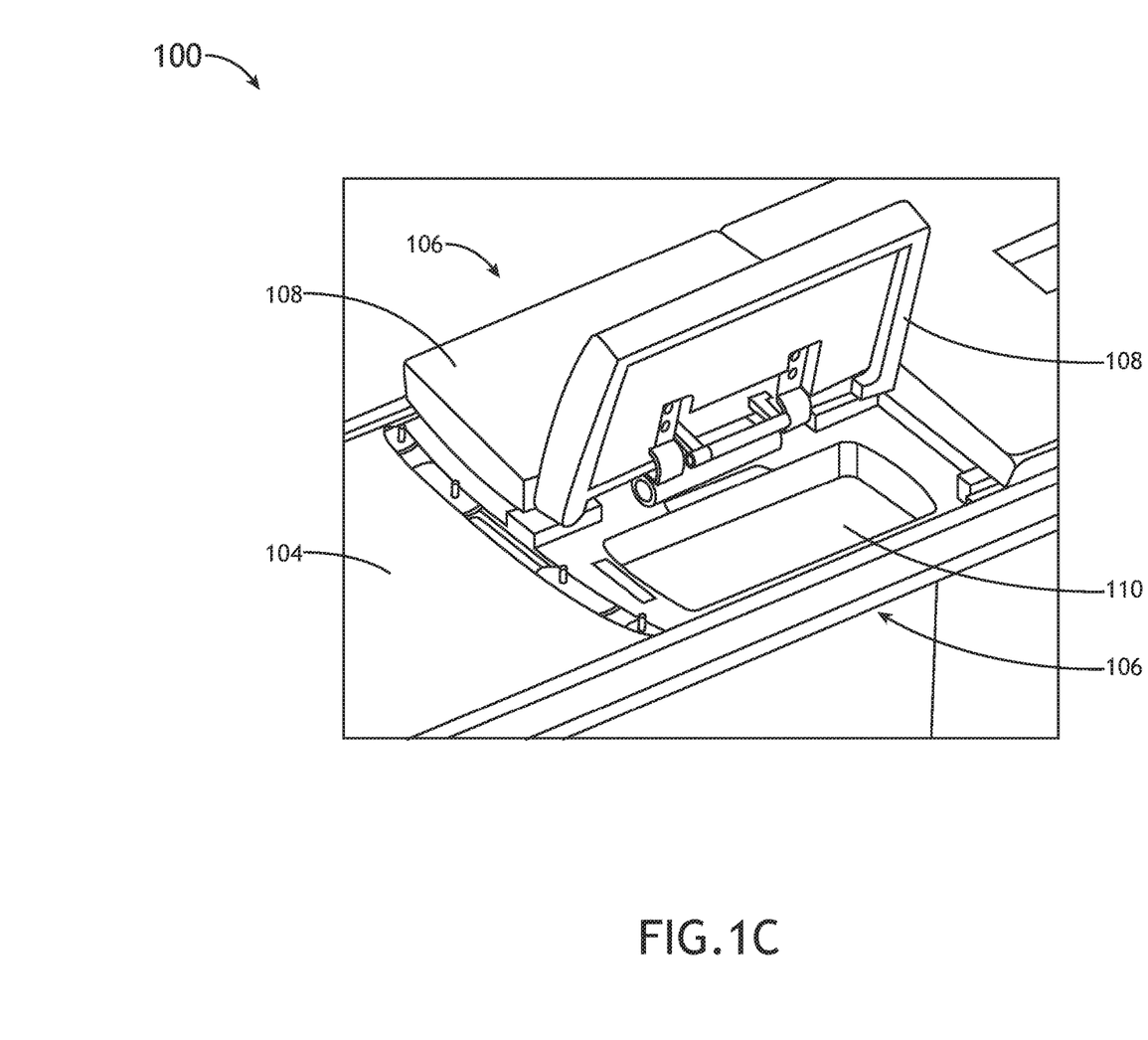
FIG. 1C illustrates a perspective view of a portion of a set of aircraft seats, in accordance with one or more embodiments of the disclosure.

FIGS. 1A-1C in general illustrate an aircraft seat assembly 100, in accordance with one or more embodiments of the disclosure. The aircraft seat assembly 100 may include one or more aircraft seats 102.

Select aircraft seats 102 (e.g., such as business-class seats) may include a center console 104 with an arm cap 106. For example, the arm cap 106 may be directly coupled to the center console 104. By way of another example, the arm cap 106 may be coupled to a frame or chassis, and the frame or chassis may be coupled to the center console 104. The arm cap 106 may include a cushion 108. The arm cap 106 may provide access to a storage compartment 110 within the center console 104. In select arrangements, adjacent aircraft seats 102 may share a center console 104, with respective arm caps 106 allowing access to respective storage compartment 110.

The storage compartment 110 may be configured to receive and hold (e.g., contain, secure, or the like) one or more passenger amenities including, but not limited to, paper-printed materials (e.g., magazines, newspapers, pamphlets, or the like), handsets, select personal electronic devices (e.g., phones, tablets, phablets, laptops, music devices, digital video disc (DVD) players, handheld gaming consoles or devices, or the like), food products, drink products, or the like. The storage compartment 110 may include one or more electronic connections for one or more passenger amenities such as, but not limited to, one or more charging ports, one or more charging cables, or the like. The storage compartment 110 may include one or more electronic connections in communication with one or more components of the passenger compartment such as, but not limited to, one or more display device connection ports, one or more display device connection cables, one or more audio output jacks (e.g., headphone jacks), one or more audio input jacks, or the like.

In these arrangements, the arm caps 106 of each respective aircraft seat 102 may interfere with one another when either is opened or closed. For example, the cushions 108 of the arm caps 106 may interfere with one another during rotation of a first arm cap 106 while the second arm cap 106 remains stationary in a closed position. The interference may cause unnecessary wear in the cushions 108. In addition, the interference may provide a potentially-displeasing aesthetic to the aircraft seats 102. However, a solution such as increasing the gap between the cushions 108 could potentially provide similarly-displeasing aesthetic to the aircraft seats 102, and/or may require a re-design of other components of the aircraft seats 102 such that the arm caps 106 may not be swappable.

Therefore, it would be beneficial to provide aircraft seat arm caps with an improved hinge mechanism. The hinge mechanism should allow for adjacent arm caps 106 to open without interference. The mechanism should also able to the implemented within the adjacent arm caps 106 without increasing a gap between the adjacent arm caps 106.

Figure 2A:
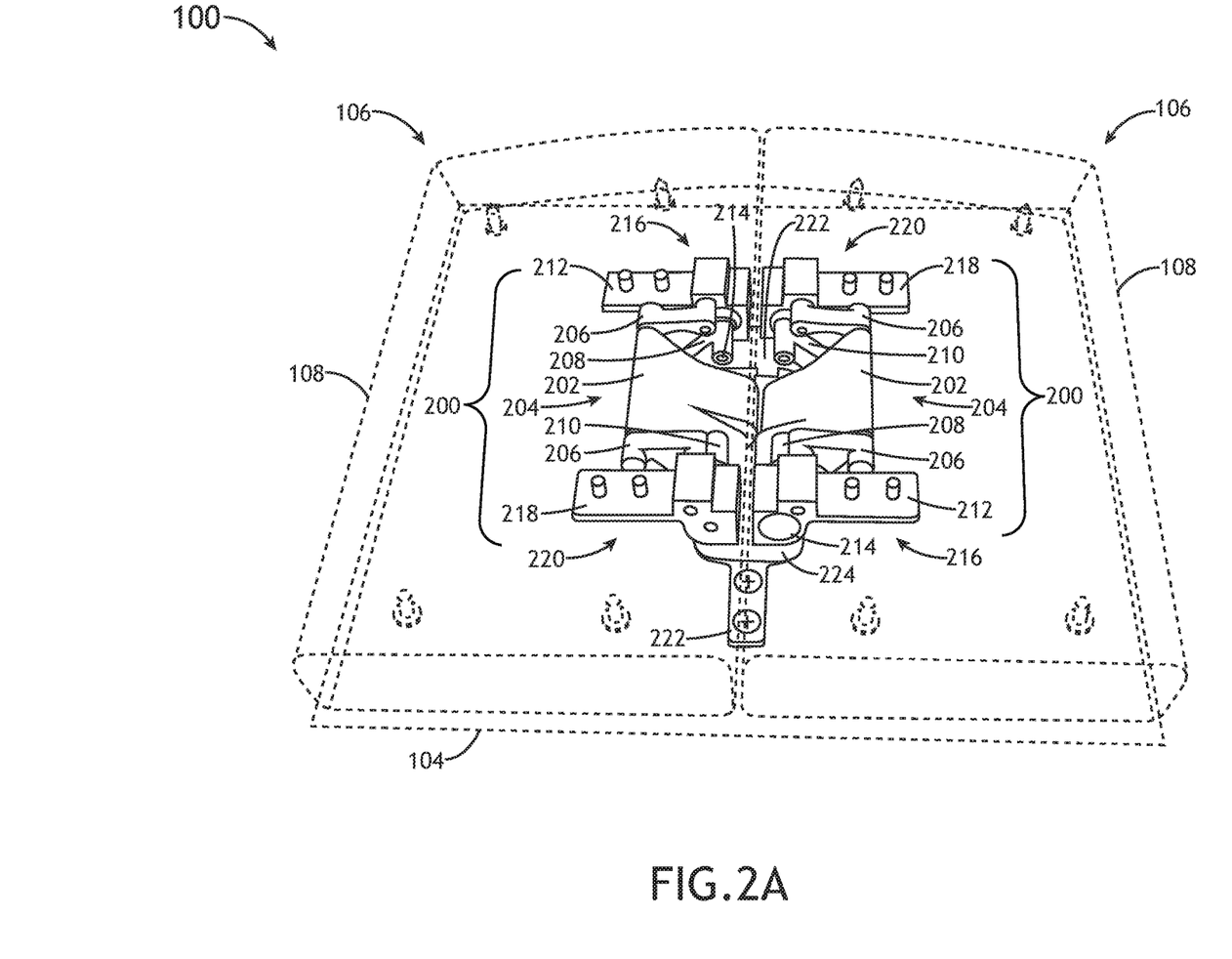
FIG. 2A illustrates a perspective view of a set of arm cap friction hinge mechanisms, in accordance with one or more embodiments of the disclosure.
Figure 2B:
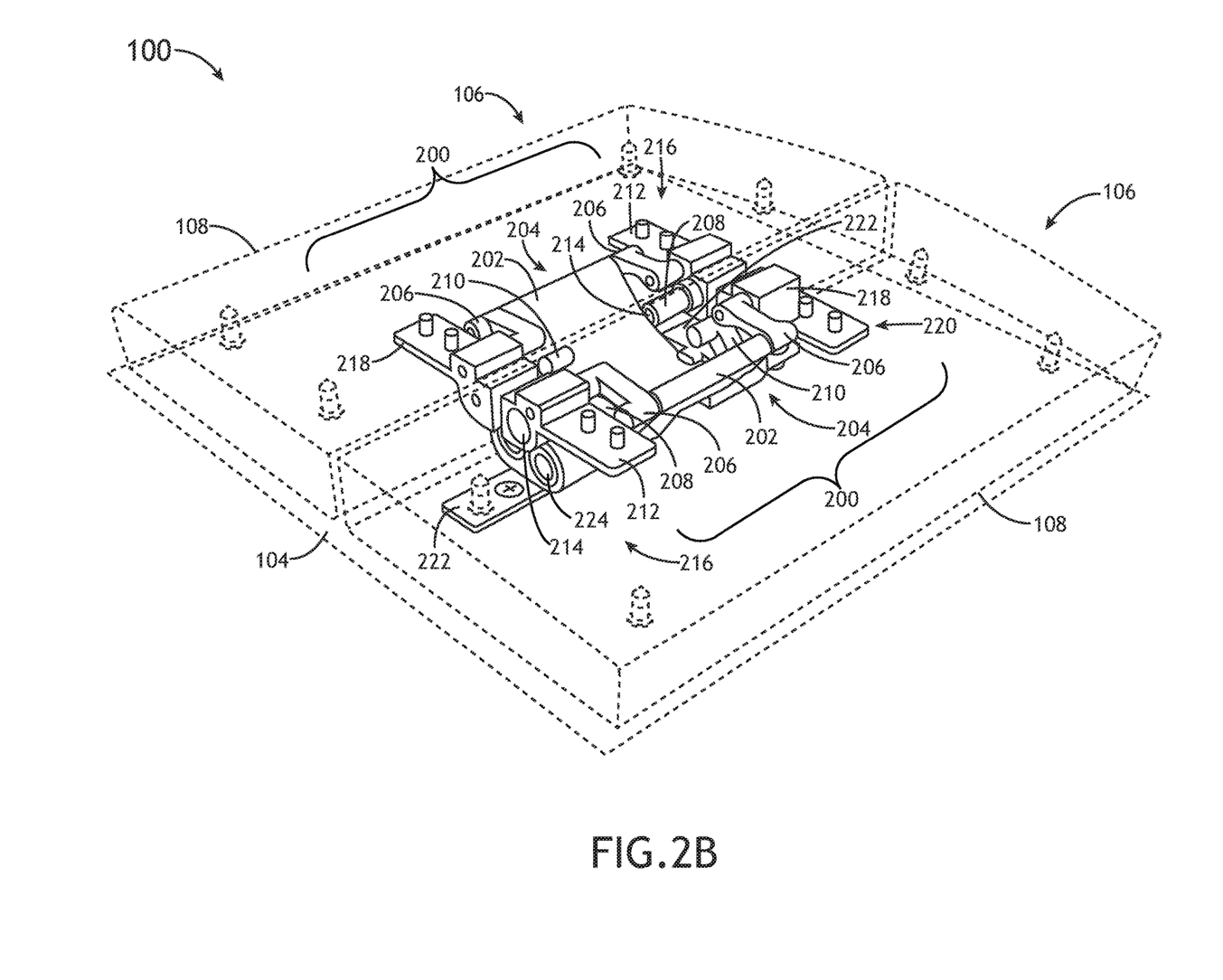
FIG. 2B illustrates a perspective view of a set of arm cap friction hinge mechanisms, in accordance with one or more embodiments of the disclosure.

FIGS. 2A and 2B in general illustrate a set of friction hinge mechanisms 200, in accordance with one or more embodiments of the disclosure. It is noted herein that "friction hinge mechanism," "hinge mechanism," "mechanism," or similar terms may be equivalent, for purposes of the disclosure. In addition, it is noted herein each arm cap may include a friction hinge mechanism 200.

A friction hinge mechanism 200 may include a center link 202. The center link 202 may be configured to receive one or more fasteners (e.g., pins, screws, or the like). It is noted herein the center link 202 and the one or more fasteners may be considered a center link assembly 204.

The friction hinge mechanism 200 may include a set of top links 206. For example, the friction hinge mechanism 200 may include two top links 206, with one on each side of the center link 202. Each of the set of top links 206 may be coupled to the center link 202 via one or more fasteners (e.g., pins, screws, or the like) received by (e.g., inserted into) the center link 202.

The friction hinge mechanism 200 may include a top friction hinge link 208. The top friction hinge link 208 may be coupled to the center link 202 via one or more fasteners (e.g., pins, screws, or the like) received by (e.g., inserted into) the center link 202. The friction hinge mechanism 200 may include a top pin link 210. The top pin link 210 may be coupled to the center link 202 via one or more fasteners (e.g., pins, screws, or the like) received by (e.g., inserted into) the center link 202. It is noted herein the top pin link 210 (and its corresponding top link 206) may be coupled to a different side of the center link 202 than the top friction hinge link 208 (and its corresponding top link 206). In this regard, the friction hinge mechanism may be handed.

The friction hinge mechanism 200 may include an upper hinge mount 212. The upper hinge mount 212 may be coupled to the top friction hinge link 208 via a friction hinge 214. For example, the upper hinge mount 212 may be coupled to the top friction hinge link 208 opposite the center link 202 (e.g., opposite sides of the top friction hinge link 208). It is noted herein, however, the upper hinge mount 218 may be coupled to the top friction hinge link 208 via one or more fasteners (e.g., pins, screws, or the like). The upper hinge mount 212 may be coupled to a top link 206 of the set of top links 206 via one or more fasteners (e.g., pins, screws, or the like). For example, the upper hinge mount 212 may be coupled to the top link 206 opposite the center link 202 (e.g., opposite sides of the top link 206). It is noted herein the upper hinge mount 212, the friction hinge 214, and the one or more fasteners may be considered a hinge mount assembly 216. It is noted herein, however, the upper hinge mount 218 may be coupled to the top link 206 via a friction hinge.

The friction hinge mechanism 200 may include an upper pin mount 218. The upper pin mount 218 may be coupled to a top link 206 of the set of top links 206 via one or more fasteners (e.g., pins, screws, or the like). For example, the upper pin mount 218 may be coupled to the top link 206 opposite the center link 202 (e.g., opposite sides of the top link 206). The upper pin mount 218 may be coupled to the top pin link 210 via one or more fasteners (e.g., pins, screws, or the like). For example, the upper pin mount 218 may be coupled to the top pin link 210 opposite the center link 202 (e.g., opposite sides of the top pin link 210). It is noted herein the upper pin mount 218 and the one or more fasteners may be considered a pin mount assembly 220. It is noted herein, however, the upper pin mount 218 may be coupled to the top link 206 and/or the top pin link 210 via a friction hinge.

The friction hinge mechanism 200 may be coupled to a set of hinge mounts 222. For example, the center link 202 may be coupled to a hinge mount 222 of the set of hinge mounts 222 via a friction hinge 224. For instance, the center link 202 may be coupled to each of the set of hinge mounts 222 via a friction hinge 224. By way of another example, the center link 202 may be coupled to a second hinge mount 222 of the set of hinge mounts 222 via one or more fasteners (e.g., pins, screws, or the like). For instance, the center link 202 may be coupled to a first hinge mount 222 of the set of hinge mounts 222 via a friction hinge 224, and a second hinge mount 222 of the set of hinge mounts 222 via one or more fasteners.

Where the friction hinge mechanism 200 is installed in each of a set of adjacent arm caps 106, it is noted herein each hinge mount 222 of the set of hinge mounts 222 may be a double hinge mount 222. Although embodiments of the disclosure illustrate a set of friction hinge mechanisms 200 being used with adjacent arm caps 106, however, it is noted herein the friction hinge mechanism 200 may be used with a standalone or singular arm cap 106 (e.g., where the aircraft seat 102 is standalone or singular). Here, each hinge mount 222 of the set of hinge mounts 222 may be a single hinge mount 222. Therefore, the above description should not be interpreted as a limitation on the present disclosure but merely an illustration.

FIGS. 3A-3F in general illustrate an operation of the friction hinge mechanism 200, in accordance with one or more embodiments of the disclosure. Although FIGS. 3A-3F illustrate parts of friction hinge mechanisms 200 from adjacent arm caps 106, it should be understood from FIGS. 2A and 2B that the friction hinge mechanisms 200 are handed such that each friction hinge mechanism 200 includes both parts as illustrated in FIGS. 3A-3F in the adjacent arm caps 106.

The friction hinge mechanism 200 may include a linkage assembly 300. For example, the linkage assembly 300 may be a four-bar linkage assembly. For instance, the linkage assembly 300 may be defined by at least a portion of the center link 202, a top link 206, a top friction hinge link 208, and at least a portion of an upper hinge mount 212.

The friction hinge mechanism 200 may include a linkage assembly 302. For example, the linkage assembly 302 may be a four-bar linkage assembly. For instance, the linkage assembly 302 may be defined by at least a portion of the center link 202, a top link 206, a top pin link 210, and at least a portion of an upper pin mount 218.

Figure 3A:
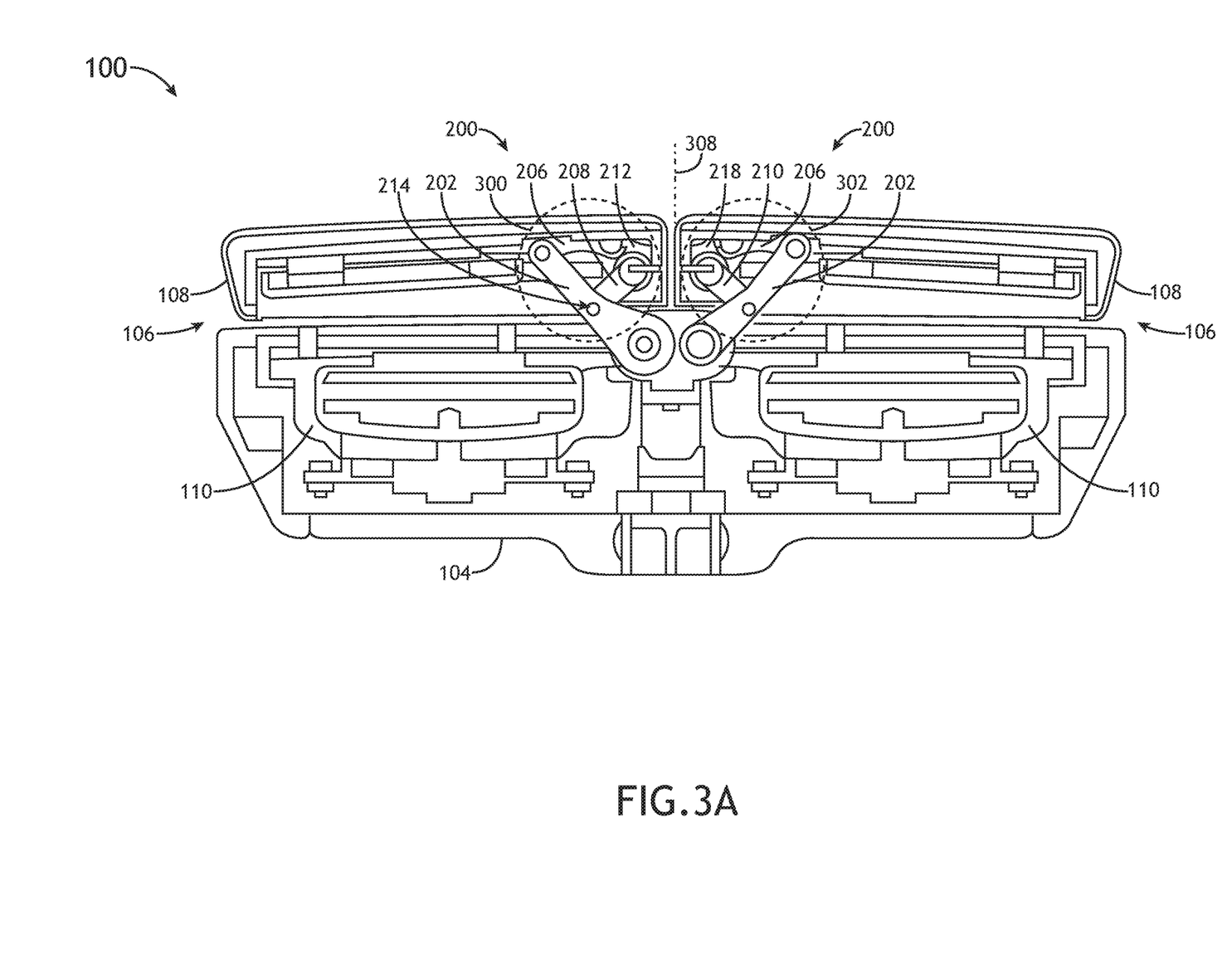
FIG. 3A illustrates a cross-section elevation view of a set of arm cap friction hinge mechanisms, in accordance with one or more embodiments of the disclosure.
Figure 3B:
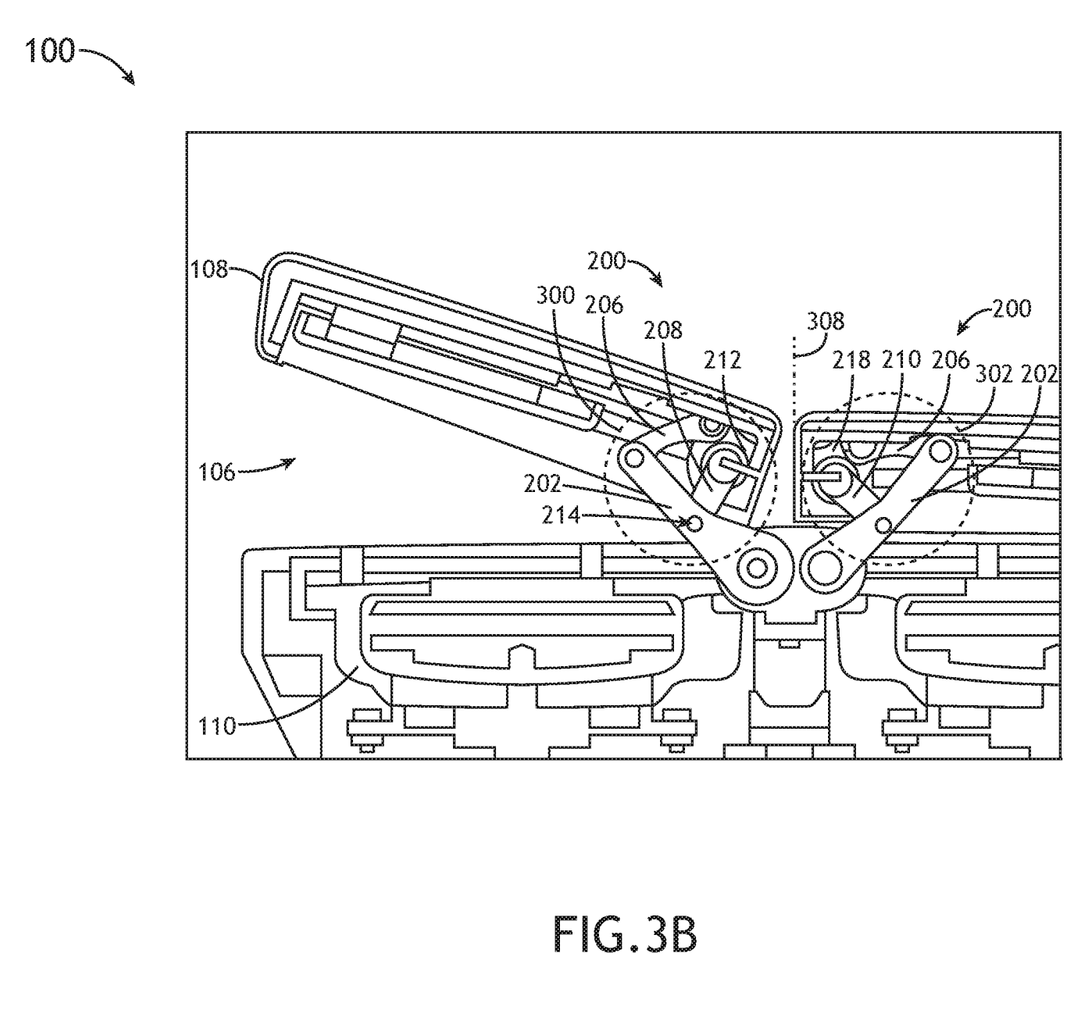
FIG. 3B illustrates a cross-section elevation view of a set of arm cap friction hinge mechanisms, in accordance with one or more embodiments of the disclosure.
Figure 3C:
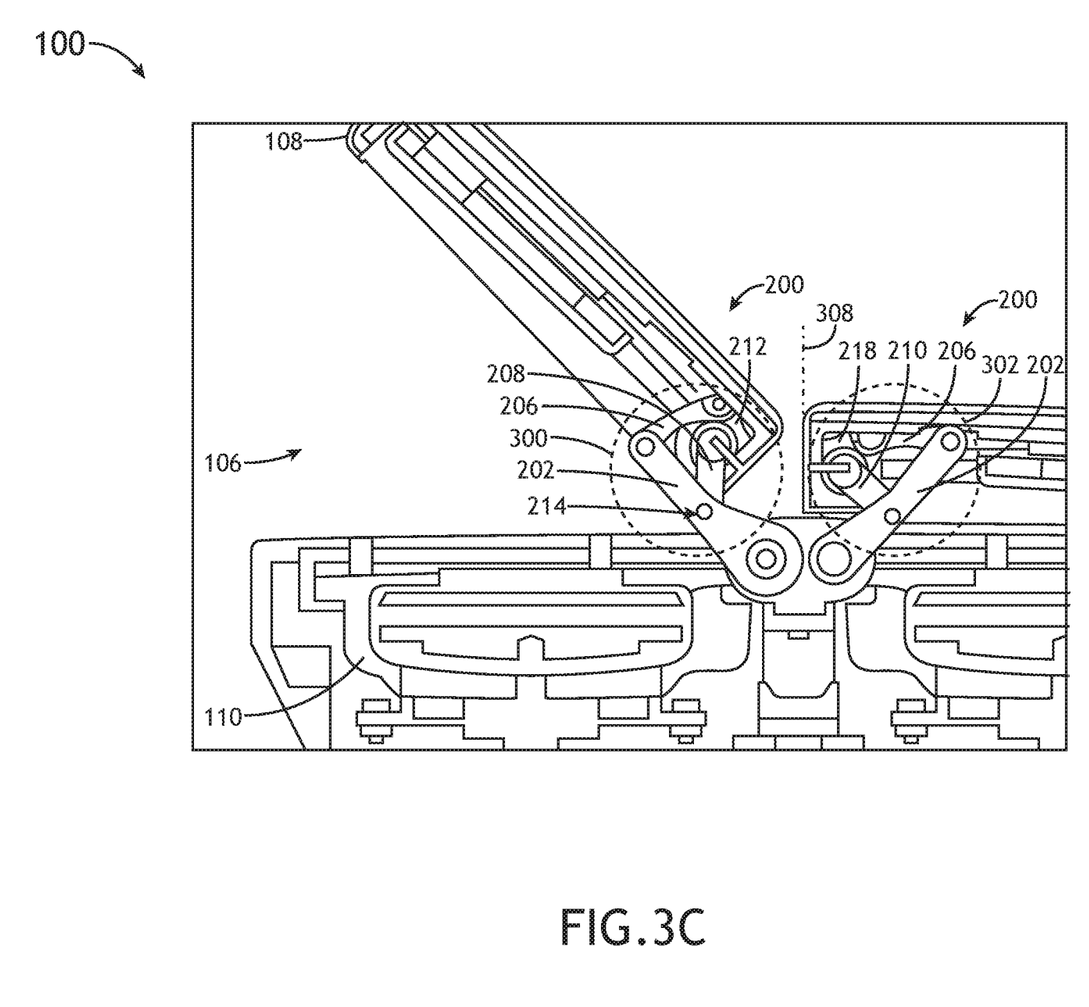
FIG. 3C illustrates a cross-section elevation view of a set of arm cap friction hinge mechanisms, in accordance with one or more embodiments of the disclosure.
Figure 3D:
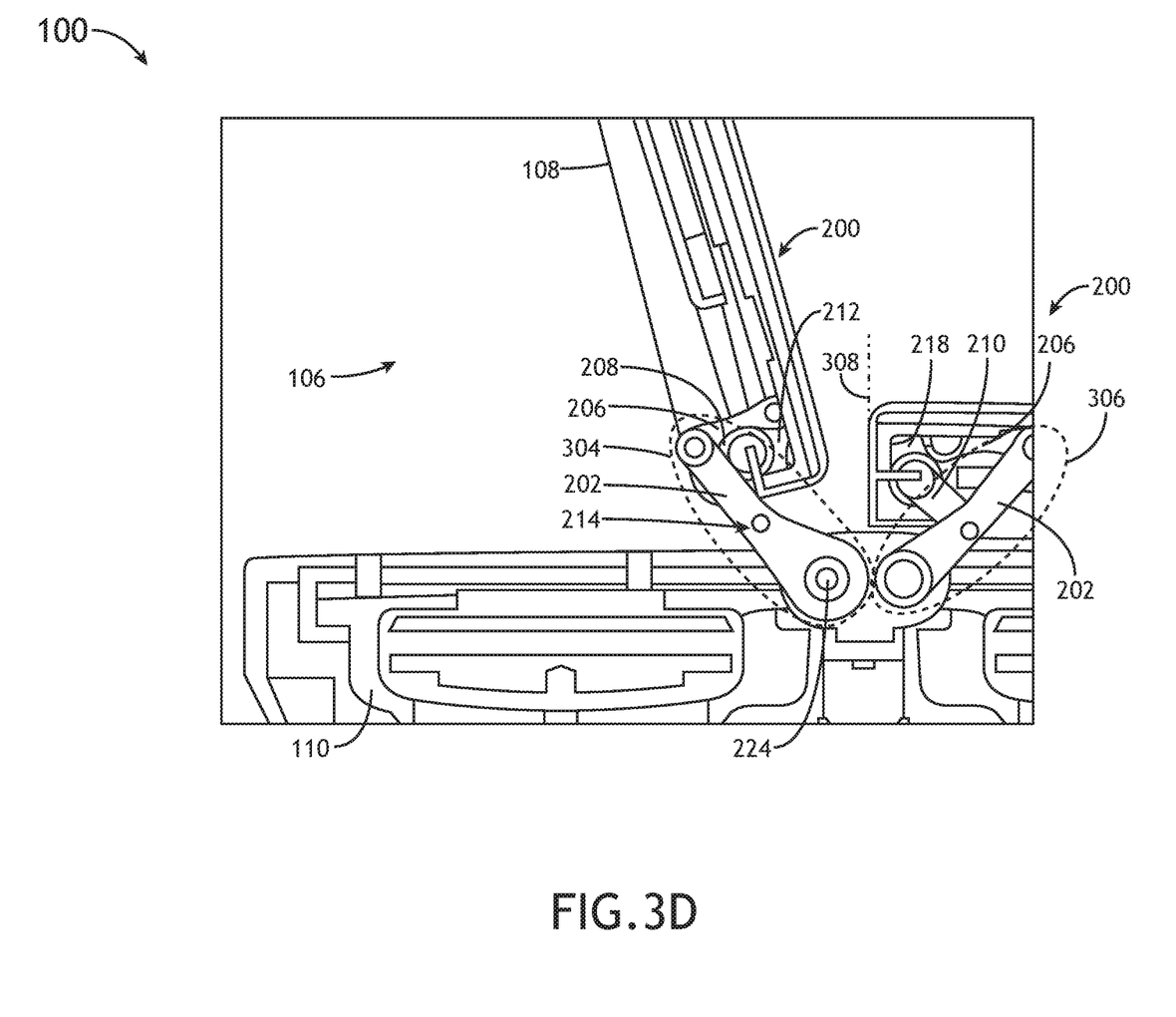
FIG. 3D illustrates a cross-section elevation view of a set of arm cap friction hinge mechanisms, in accordance with one or more embodiments of the disclosure.

A friction hinge 214 may act on the linkage assembly 300 (e.g., directly) and the linkage assembly 302 (e.g., indirectly, through the center link 202) as the arm cap actuates between a closed position (e.g., as illustrated in FIG. 3A) and a first open position (e.g., as illustrated in FIG. 3D). The actuation between the closed position and the first open position may pass through any number of intermediate positions (e.g., example intermediate positions being illustrated in FIGS. 3B and 3C). During the actuation, the linkage assemblies 300, 302 may at least partially collapse inward. Due to the at least partial collapse inward of the linkage assemblies 300, 302, the arm cap 106 actuates not about a single fixed point, but instead actuates about a point that shifts with the at least partial collapsing of the linkage assemblies 300, 302. It is noted herein, however, the linkage assemblies 300, 302 may include linkages that are configured to allow the arm cap 106 to actuate about a single fixed point. Therefore, the above description should not be interpreted as a limitation on the present disclosure but merely an illustration.

The friction hinge mechanism 200 may include a linkage assembly 304. For example, the linkage assembly 304 may include, but is not limited to, the center link 202.

The friction hinge mechanism 200 may include a linkage assembly 306. For example, the linkage assembly 304 may include, but is not limited to, the center link 202.

Figure 3E:
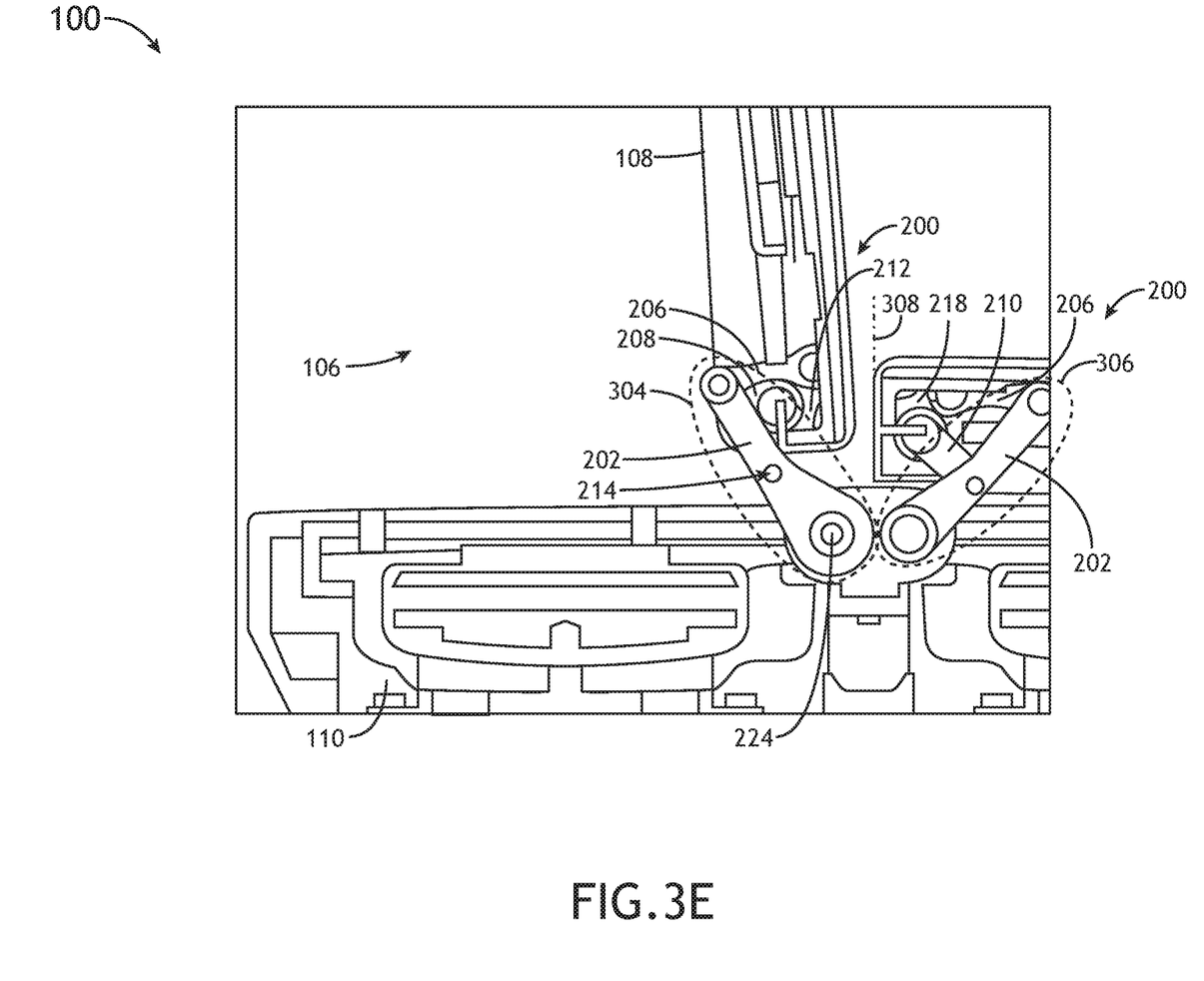
FIG. 3E illustrates a cross-section elevation view of a set of arm cap friction hinge mechanisms, in accordance with one or more embodiments of the disclosure.
Figure 3F:
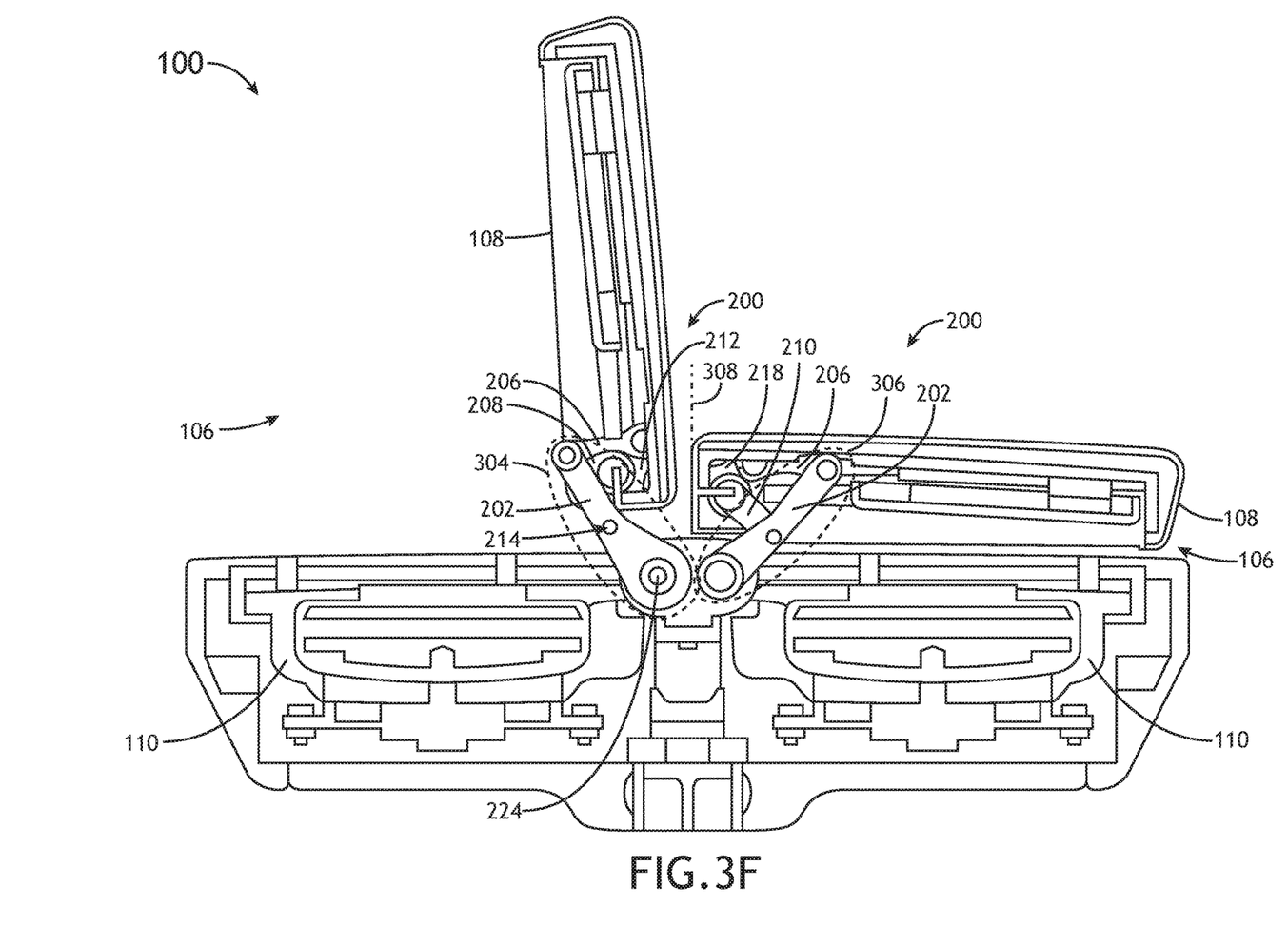
FIG. 3F illustrates a cross-section elevation view of a set of arm cap friction hinge mechanisms, in accordance with one or more embodiments of the disclosure.

A friction hinge 224 may act on the linkage assembly 304 (e.g., directly) and the linkage assembly 306 (e.g., indirectly, through the center link 202) as the arm cap actuates between the first open position (e.g., as illustrated in FIG. 3D) and a second open position (e.g., as illustrated in FIG. 3F). The actuation between the first open position and the second open position may pass through any number of intermediate positions (e.g., an example intermediate position being illustrated in FIG. 3E). For purposes of the disclosure, the first open position may be considered a partially-open position and the second open position may be considered a fully-open position.

During the actuation, the linkage assemblies 304, 306 may rotate or pivot about an axis through the friction hinge 224. Due to the increased space or gap generated between the adjacent arm caps 106 during the actuation between the closed position and the first open position, the arm cap 106 is allowed to actuate between the first open position and the second open position without interfering with the adjacent arm cap 106 (e.g., interference caused by the cushions 108 coming into contact). However, the increased space or gap is only generated during the actuation, and is not present when the arm cap 106 is in the closed position or in the fully open position.

The friction hinge 224 may provide a greater force on the linkage assemblies 304, 306 (e.g., the center link 202) than the friction hinge 214 provides on the linkage assemblies 300, 302, such that the actuation between the closed position and the first open position is fully completed before the actuation between the first open position and the second open position occurs.

The friction hinge 214 and/or the friction hinge 224 may be configured to hold the arm cap 106 at select positions absent an applied force.

The friction hinge 224 may be a one-way friction hinge 224, which keeps the linkage assemblies 304, 306 from actuating absent an applied force until the completion of the transition between the closed position and the first open position. The one-way nature of the friction hinge 224, however, may allow the linkage assemblies 304, 306 to actuate prior to the actuation of the linkages 300, 302 between the second open position and the closed position.

The friction hinge 214 may be a two-way friction hinge 214, which prevents the linkage assemblies 300, 302 from actuating in any direction absent an applied force. It is noted herein, however, the friction hinge 214 may be a one-way friction hinge 214, which may prevent the linkage assemblies 300, 302 from actuating between the closed position and the first open position absent an applied force, but may allow for the linkage assemblies 300, 302 to actuate between the first open position and the closed position without any applied force.

In this regard, the friction hinge mechanism 200 may be considered a two-part mechanism, where the first part of the mechanism is the actuation between the closed position and the first open position, and the second part of the mechanism is the actuation between the first open position and the second open position. It is noted herein the friction hinge 224 may hold the arm cap 106 in the second open position, absent an applied force.

It is noted herein, however, that it is contemplated the linkage assemblies 300, 302 and the linkage assemblies 304, 306 may simultaneously actuate, to the extent there is no interference by the arm cap 106 with the adjacent arm cap 106 (e.g., interference caused by the cushions 108 coming into contact).

As such, an arm cap 106 may be configured to rotate from the closed position to a fully-open position without breaching a plane 308 (e.g., as defined by a surface of an adjacent arm cap 306), where the breaching the plane 308 would cause interference between the arm caps 106 (e.g., by allowing the cushions 108 to come into contact with each other). In addition, the actuation about the linkage assemblies 300, 302, and then the second actuation about the linkage assemblies 304, 306, allow for actuation of the adjacent arm caps 106 without a need for an increased gap between the adjacent arm caps 106.

In this regard, the arm cap 106 is allowed to actuate between the closed position and the first open position without interfering with (e.g., avoiding) the adjacent arm cap 106 (e.g., interference caused by the cushions 108 coming into contact). It is noted herein the friction hinge 214 may hold the arm cap 106 in the first open position, absent an applied force.

Although not shown, it should be understood the arm cap 106 may actuate between the second open position and the closed position via one or more of the actuations illustrated in FIGS. 3A-3F being performed in a different (e.g., reverse) order.

Although embodiments of the present disclosure describe friction hinges 214, 224, it is noted herein the various components of the friction hinge mechanism 200 may be configured with physical limiters (e.g., mechanical detents, or the like) that provide additional force to hold the arm cap 106 in select positions and/or prevent out-of-turn actuation, similar to the operation of the friction hinges 214, 224. Therefore, the above description should not be interpreted as a limitation on the present disclosure but merely an illustration.

It is noted herein the friction hinge mechanism 200 may need to be configured in accordance with aviation guidelines and/or standards set forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), SAE International, or any other standards setting organization or company; the Radio Technical Commission for Aeronautics (RTCA) or any other guidelines agency or organization; or the like.

Although embodiments of the disclosure illustrate the friction hinge mechanism 200 being integrated with the aircraft seats 102, it is noted herein, however, that the friction hinge mechanism 200 and/or components of the friction hinge mechanism 200 are not limited to the aviation environment and/or the aircraft components within the aviation environment. For example, the friction hinge mechanism 200 and/or components of the friction hinge mechanism 200 may be configured for any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art. By way of another example, the friction hinge mechanism 200 and/or components of the friction hinge mechanism 200 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An arm cap friction hinge mechanism, comprising:
   a center link;
   a first top link coupled to the center link;
   a top friction hinge link coupled to the center link;
   an upper hinge mount coupled to an arm cap of an aircraft seat, the upper hinge mount coupled to the first top link, the upper hinge mount coupled to the top friction hinge link via a first friction hinge, the arm cap being configured to actuate between a closed position and a first open position around the first friction hinge;
   a second top link coupled to the center link;
   a top pin link coupled to the center link;
   an upper pin mount coupled to the arm cap of the aircraft seat, the upper pin mount coupled to the second top link and the top pin link; and
   at least one hinge mount coupled to the aircraft seat, the center link coupled to the at least one hinge mount via at least a second friction hinge, the arm cap being configured to actuate between the first open position and a second open position about an axis through the at least a second friction hinge.

2. The friction hinge mechanism of claim 1, an actuation of the arm cap via the arm cap friction hinge mechanism being configured to allow a cushion coupled to the arm cap to avoid an adjacent cushion of an adjacent arm cap during actuation.

3. The friction hinge mechanism of claim 1, the first top link and the top friction hinge link coupled to a first side of the center link, the second top link and the top pin link coupled to a second side of the center link.

4. The friction hinge mechanism of claim 1, the upper hinge mount being coupled to the first top link and the top friction hinge link opposite the center link.

5. The friction hinge mechanism of claim 1, the upper pin mount being coupled to the second top link and the top pin link opposite the center link.

6. The friction hinge mechanism of claim 1, the at least one hinge mount including a first hinge mount and a second hinge mount.

7. The friction hinge mechanism of claim 6, the at least a second friction hinge including a second friction hinge and a third friction hinge, the first hinge mount being coupled to the center link via the second friction hinge and the second hinge mount being coupled to the center link via the third friction hinge.

8. The friction hinge mechanism of claim 1, portions of the center link, the first top link, the top friction hinge link, and the upper hinge mount forming a first linkage assembly.

9. The friction hinge mechanism of claim 8, portions of the center link, the second top link, the top pin link, and the upper pin mount forming a second linkage assembly.

10. The friction hinge mechanism of claim 9, the first friction hinge being configured to act on the first linkage assembly and the second linkage assembly, the arm cap being configured to actuate between the closed position and the first open position around the first friction hinge, the first linkage assembly, and the second linkage assembly.

11. The friction hinge mechanism of claim 10, the at least a second friction hinge providing a greater force on the center link than the force provided by the first friction hinge on the first linkage assembly and the second linkage assembly.

12. The friction hinge mechanism of claim 1, the first friction hinge being a one-way friction hinge.

13. The friction hinge mechanism of claim 1, the at least a second friction hinge being a two-way friction hinge.

14. An arm cap friction hinge mechanism, comprising:
    a first linkage assembly coupled to an arm cap of an aircraft seat;
    a second linkage assembly coupled to the arm cap of the aircraft seat;
    a center link, the center link being a linkage of the first linkage assembly and a linkage of the second linkage assembly;
    a first friction hinge being configured to act on the first linkage assembly and the second linkage assembly, the arm cap being configured to actuate between a closed position and a first open position around the first friction hinge, the first linkage assembly, and the second linkage assembly;
    at least one hinge mount coupled to the aircraft seat; and
    at least a second friction hinge, the center link coupled to the at least one hinge mount via the at least a second friction hinge, the arm cap being configured to actuate between the first open position and a second open position about an axis through the at least a second friction hinge.

15. The friction hinge mechanism of claim 14, an actuation of the arm cap around the first friction hinge, the first linkage assembly, the second linkage assembly, and the at least a second friction hinge being configured to allow a cushion coupled to the arm cap to avoid an adjacent cushion of an adjacent arm cap during actuation.

* * * * *